(12) United States Patent
Lim et al.

(10) Patent No.: US 8,483,504 B2
(45) Date of Patent: Jul. 9, 2013

(54) DIGITAL AUTO-FOCUSING APPARATUS AND METHOD

(75) Inventors: Jae-Guyn Lim, Suwon-si (KR); Joo-Young Kang, Suwon-si (KR); Hyun-Wook Ok, Seoul (KR); Seong-Deok Lee, Suwon-si (KR)

(73) Assignees: Samsung Electronics Co., Ltd., Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 1267 days.

(21) Appl. No.: 12/292,467

(22) Filed: Nov. 19, 2008

(65) Prior Publication Data

US 2009/0136148 A1 May 28, 2009

(30) Foreign Application Priority Data

Nov. 26, 2007 (KR) ........................ 10-2007-0121094

(51) Int. Cl.
| | |
|---|---|
| G06K 9/00 | (2006.01) |
| G06K 9/40 | (2006.01) |
| G06K 9/36 | (2006.01) |
| H04N 5/235 | (2006.01) |
| H04N 5/228 | (2006.01) |
| H04N 5/225 | (2006.01) |
| G02B 13/16 | (2006.01) |
| G06T 15/40 | (2011.01) |

(52) U.S. Cl.
USPC ........... 382/266; 382/106; 382/255; 382/284; 348/222.1; 348/335; 348/345; 345/421

(58) Field of Classification Search
USPC ................. 382/100, 103, 106, 154, 173, 224, 382/254–255, 266, 274–275, 282, 284–285; 348/207.99, 207.11, 335, 345–357; 359/462–477; 345/418, 421–422

See application file for complete search history.

(56) References Cited

U.S. PATENT DOCUMENTS

| | | | | |
|---|---|---|---|---|
| 5,524,162 | A * | 6/1996 | Levien | 382/263 |
| 6,856,708 | B1 * | 2/2005 | Aoki | 382/284 |

(Continued)

FOREIGN PATENT DOCUMENTS

| | | |
|---|---|---|
| JP | 10-215402 | 8/1998 |
| JP | 2003-222787 | 8/2003 |

(Continued)

OTHER PUBLICATIONS

Jaeguyn Lim, Jooyoung Kang, and Hyunwook Ok, Robust local restoration of space-variant blur image; Proc. SPIE 6817, 68170S (2008).*

(Continued)

Primary Examiner — Randolph I Chu
Assistant Examiner — Nathan Bloom
(74) Attorney, Agent, or Firm — Staas & Halsey LLP

(57) ABSTRACT

An apparatus and method for digital auto-focus are provided. The apparatus includes a local block generator generating a local block from an input image, a distance-estimation unit estimating distances of each image of the local block, a focal-distance-setting unit setting one of the estimated distances of the local block image as a focal distance of the input image, a reblurred-image generator generating a reblurred image from the local block image, a reconstructed image generator generating an in-focus image focused to the estimated distances from the local block image, a local-block-image-matching unit matching the reblurred image to the in-focus image with different weight values based on the set focal distance, and a final-image generator generating a final image by summing the matched local block images.

21 Claims, 12 Drawing Sheets
(1 of 12 Drawing Sheet(s) Filed in Color)

U.S. PATENT DOCUMENTS

| | | | |
|---|---|---|---|
| 2003/0189568 A1* | 10/2003 | Alkouh | 345/422 |
| 2004/0080661 A1* | 4/2004 | Afsenius et al. | 348/345 |
| 2006/0115174 A1* | 6/2006 | Lim et al. | 382/260 |
| 2008/0101728 A1* | 5/2008 | Vitsnudel et al. | 382/317 |
| 2008/0158377 A1* | 7/2008 | Chanas et al. | 348/222.1 |
| 2008/0259154 A1* | 10/2008 | Garrison et al. | 348/14.01 |

FOREIGN PATENT DOCUMENTS

| | | |
|---|---|---|
| JP | 2005-141068 | 6/2005 |
| KR | 10-2007-0057231 | 6/2007 |

OTHER PUBLICATIONS

M. Dirk Robinson and David G. Stork, "Joint digital-optical design of superresolution multiframe imaging systems," Appl. Opt. 47, B11-B20 (Feb. 5, 2008).*

Ido Raveh and Zeev Zalevsky, "All-optical axially multi-regional super resolved imaging," Opt. Express 15, 17912-17921 (Dec 24, 2007).*

Andreas Brückner, Jacques Duparré, Andreas Bräuer, and Andreas Tünnermann, "Analytic modeling of the angular sensitivity function and modulation transfer function of ultrathin multichannel imaging systems," Opt. Lett. 32, 1758-1760 (Apr. 27, 2007).*

Garcia, J.; Sanchez, J.M.; Orriols, X.; Binefa, X.;, "Chromatic aberration and depth extraction," Pattern Recognition, 2000. Proceedings. 15th International Conference on, vol. 1, No., pp. 762-765 vol. 1, 2000.*

Shin and Hwang et al., Blur Identification and Image Restoration Based on Evolutionary Multiple Object Segmentation for Digital Auto-focusing, Publisher: Springer Berlin / Heidelberg, Combinatorial Image Analysis, Lecture Notes in Computer Science, 2005, vol. 3322/2005, 656-668.*

Ishita De, Bhabatosh Chanda, Buddhajyoti Chattopadhyay, Enhancing effective depth-of-field by image fusion using mathematical morphology, Image and Vision Computing, vol. 24, Issue 12, Dec. 1, 2006, pp. 1278-1287, ISSN 0262-8856.*

Bimber, Oliver, and Andreas Emmerling. "Multifocal projection: A multiprojector technique for increasing focal depth." Visualization and Computer Graphics, IEEE Transactions on 12.4 (2006): 658-667.*

* cited by examiner

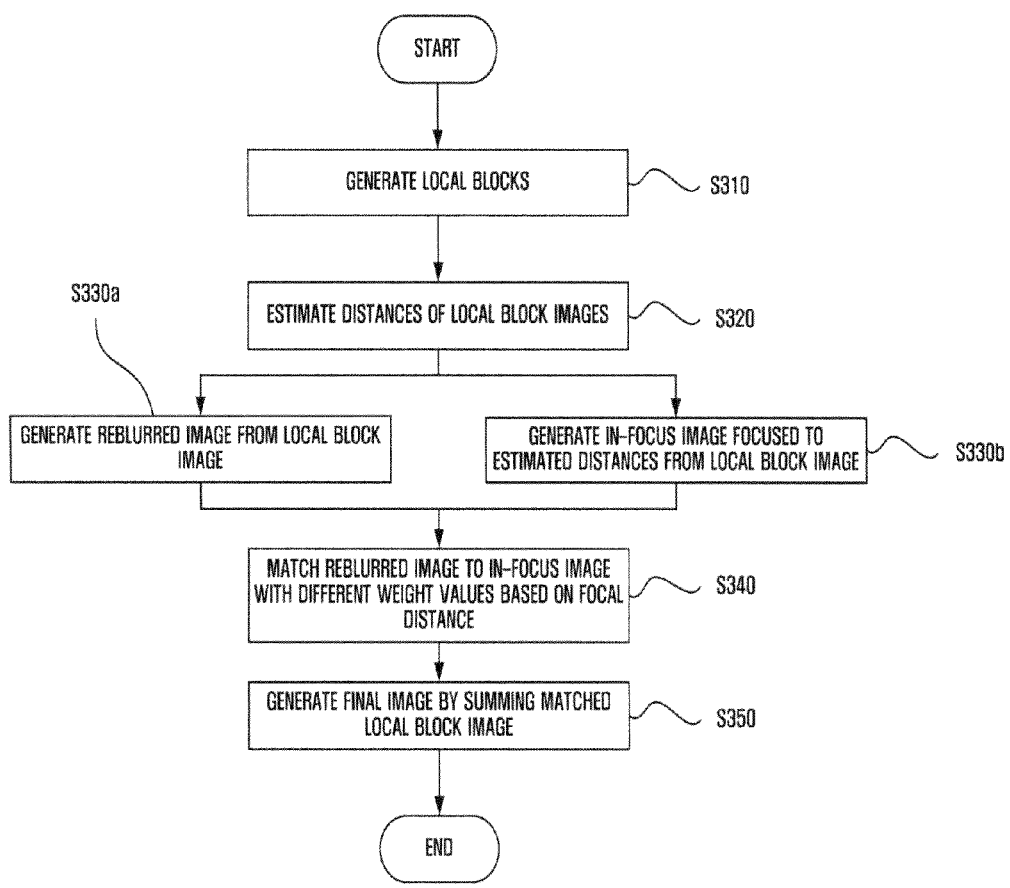

DIGITAL AUTO-FOCUSING APPARATUS AND METHOD

CROSS-REFERENCE TO RELATED APPLICATION

This application claims priority from Korean Patent Application No. 10-2007-0121094 filed on Nov. 26, 2007 in the Korean Intellectual Property Office, the disclosure of which is incorporated herein by reference in its entirety.

BACKGROUND OF THE INVENTION

1. Field of the Invention

The present invention relates to an apparatus and method for digital auto-focus, and, more particularly, to an apparatus and method for digital auto-focus by image processing, rather than by a mechanical method in which a position of a lens for obtaining an image is shifted.

2. Description of the Related Art

Most commercial image-capture devices employ a variety of auto-focusing (AF) systems.

Adjustment methods of auto-focusing (AF) employed in conventional image-capture devices are broadly classified into two types: infrared auto-focusing (IRAF) and semi-digital auto-focusing (SDAF). In IRAF, a focus is accurately detected by an analysis module using a return distance of a wavelength, and the focus is adjusted by a control module by moving a position of a lens using a focus detection result provided from the analysis module. In SDAF, high-frequency components are calculated by an analysis module to accurately detect a focus and the focus is adjusted by a control module by moving a position of a lens, similar to IRAF.

The mechanically adjusting of the lens by shifting the lens in this way, however, involves limitations in the position and range of DoF (Depth of Focus), for setting the focus according to the lens characteristic and lens ranging.

Accordingly, the present invention proposes a fully digital auto-focusing (FDAF), in which the position and range of DoF can be adjusted by image processing without driving a lens.

SUMMARY OF THE INVENTION

The present invention provides an apparatus and method for digital auto-focus by image processing, rather than by a mechanical method in which a position of a lens for obtaining an image is shifted.

However, aspects of the present invention are not restricted to the one set forth herein. The above and other aspects of the present invention will become more apparent to one of ordinary skill in the art to which the present invention pertains by referencing the detailed description of the present invention given below.

The above and other objects of the present invention will be described in or be apparent from the following description of the preferred embodiments.

According to an aspect of the present invention, there is provided an apparatus for digital auto-focus including a local block generator generating a local block from an input image, a distance-estimation unit estimating distances of each image of the local block, a focal-distance-setting unit setting one of the estimated distances of the local block image as a focal distance of the input image, a reblurred-image generator generating a reblurred image from the local block image, a reconstructed image generator generating an in-focus image focused to the estimated distances from the local block image, a local-block-image-matching unit matching the reblurred image to the in-focus image with different weight values based on the set focal distance, and a final-image generator generating a final image by summing the matched local block image.

According to another aspect of the present invention, there is provided a method for digital auto-focus including generating a local block from an input image; estimating distances of each image of the local block generating a reblurred image from the local block image and generating an in-focus image focused to the estimated distances from the local block image; matching the reblurred image to the in-focus image with different weight values based on the set focal distance; and a final-image generator generating a final image by summing the matched local block images.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become apparent by describing in detail preferred embodiments thereof with reference to the attached drawings in which:

FIG. 13 is a flowchart illustrating a method for digital auto-focusing according to an embodiment of the present invention.

DETAILED DESCRIPTION OF THE INVENTION

Figure 1:
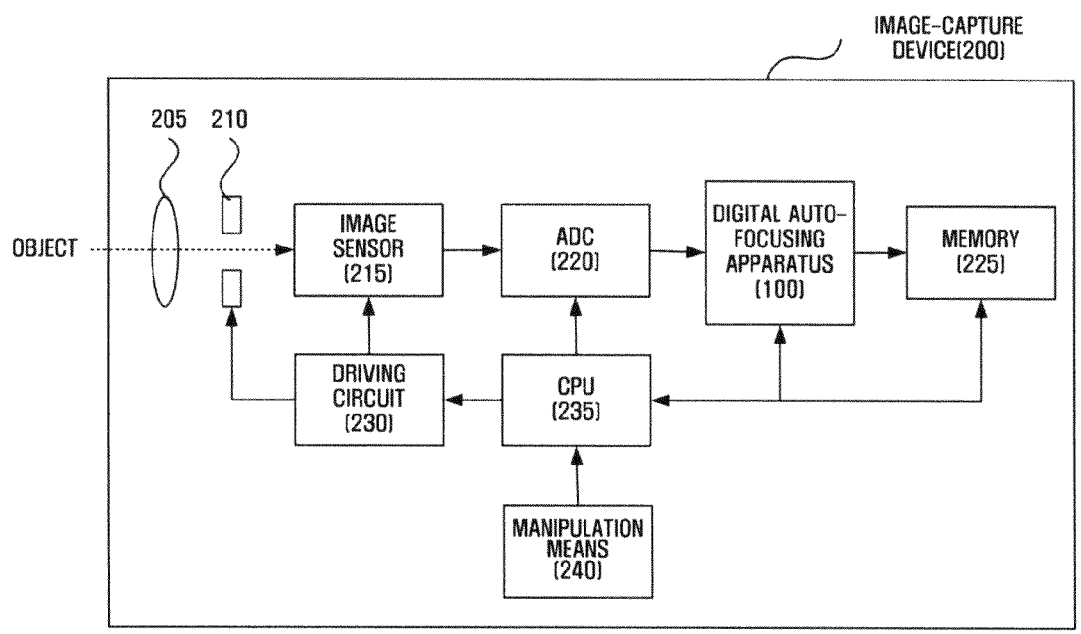
FIG. 1 is a block diagram of an image-capture device according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks.

These computer program instructions may also be stored in a computer usable or computer-readable memory that can direct a computer or other programmable data processing apparatus to function in a particular manner, such that the instructions implement the function specified in the flowchart block or blocks.

The computer program instructions may also be loaded into a computer or other programmable data processing apparatus to cause a series of operational steps to be performed in the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in reverse order, depending on the functionality involved.

FIG. 1 is a block diagram of an image-capture device according to an embodiment of the present invention.

The image-capture device 200 includes a lens 205, an iris diaphragm 210, an image sensor 215, an ADC (Analog-to-Digital Converter) 220, a digital auto-focusing apparatus 100, a memory 225, a CPU (Central Processing Unit) 235, and a manipulation means 240.

The light reflected from an object is incident onto the image sensor 215 through the lens 205 and the iris diaphragm 210. The image sensor 215 senses the light reflected from the object and converts the light into electric image information. The image sensor 215 may be a CCD, a CMOS, or other image-obtaining means known in the art. An analog signal of the image formed on a photographed surface of the image sensor 215 is converted into a digital image signal by the ADC 220. The converted digital image signal may be applied to the digital auto-focusing apparatus 100 as an input image. The digital auto-focusing apparatus 100 processes the input image signal and generates an auto-focused image. The digital auto-focusing apparatus 100 will be described later in greater detail with reference to FIG. 2.

The image processed by the digital auto-focusing apparatus 100 is stored in the memory 225. The memory 225 may be implemented by a nonvolatile memory device such as ROM, PROM, EPROM, EEPROM or flash memory, a volatile memory device such as RAM, a storage medium such as a hard disk or an optical disk, and so on.

Meanwhile, a signal from a manipulation means 240 is supplied to the CPU 235 for system control, and a control signal from the CPU 235 is supplied to the digital auto-focusing apparatus 100 or the memory 225, thereby controlling recording of the image generated by the digital auto-focusing apparatus 100. In addition, the CPU 235 may control the iris diaphragm 210. Further, the CPU 235 may supply the control signal to a driving circuit 230 for controlling an exposure time (i.e., a shutter speed) of the image sensor 215 or AGC (Auto Gain Control).

Figure 2:
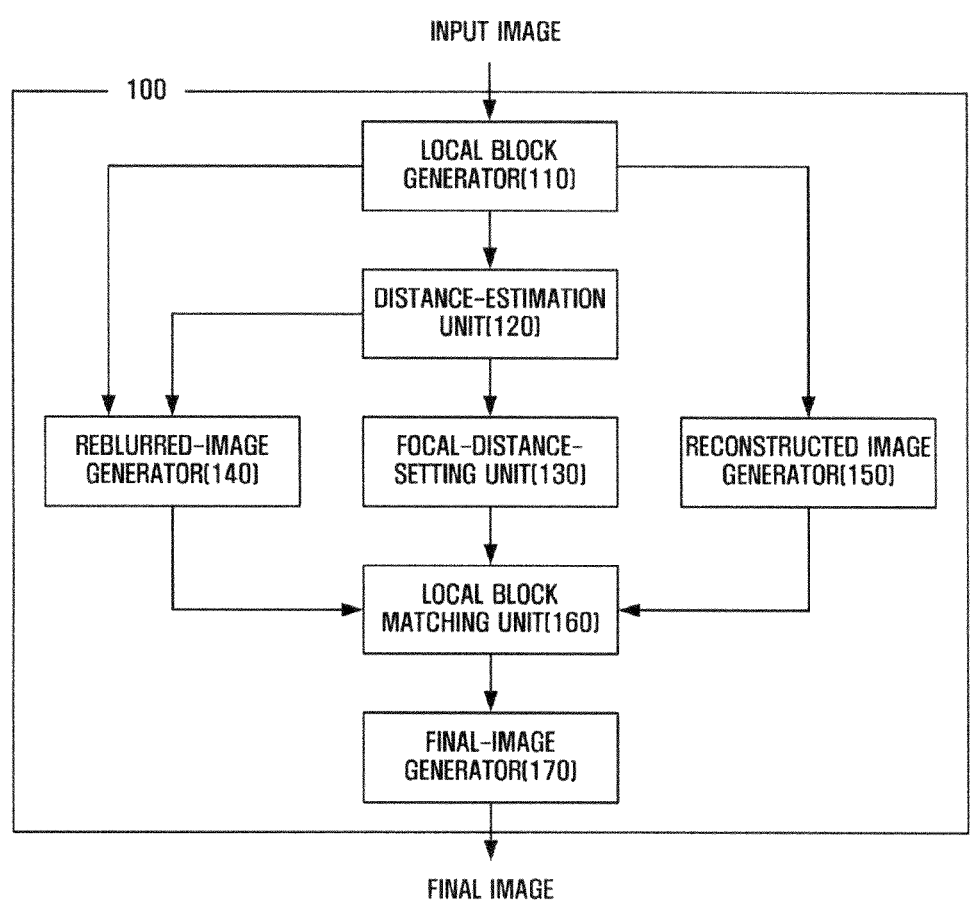
FIG. 2 is a block diagram of a digital auto-focusing apparatus according to an embodiment of the present invention.

FIG. 2 is a block diagram of a digital auto-focusing apparatus according to an embodiment of the present invention.

The digital auto-focusing apparatus includes a local block generator 110, a distance-estimation unit 120, a focal-distance-setting unit 130, a reblurred-image generator 140, a reconstructed image generator 150, a local-block-image-matching unit 160, and a final-image generator 170.

The digital auto-focusing apparatus 100 according to an embodiment of the present invention may operate as an internal component of the image-capture device 200, as shown in FIG. 1. The digital auto-focusing apparatus 100 according to an embodiment of the present invention may be a computer, a PDA (Personal Digital Assistant), a PMP (Portable Multimedia Player), a mobile phone a stand-alone device which can be mounted on a for operation.

The local block generator 110 generates local blocks from an input image. The local blocks can be generated by dividing the input image into pixels of a predetermined interval. Preferably, the local blocks are formed such that an overlapping area is produced between neighboring local blocks.

Figure 3:
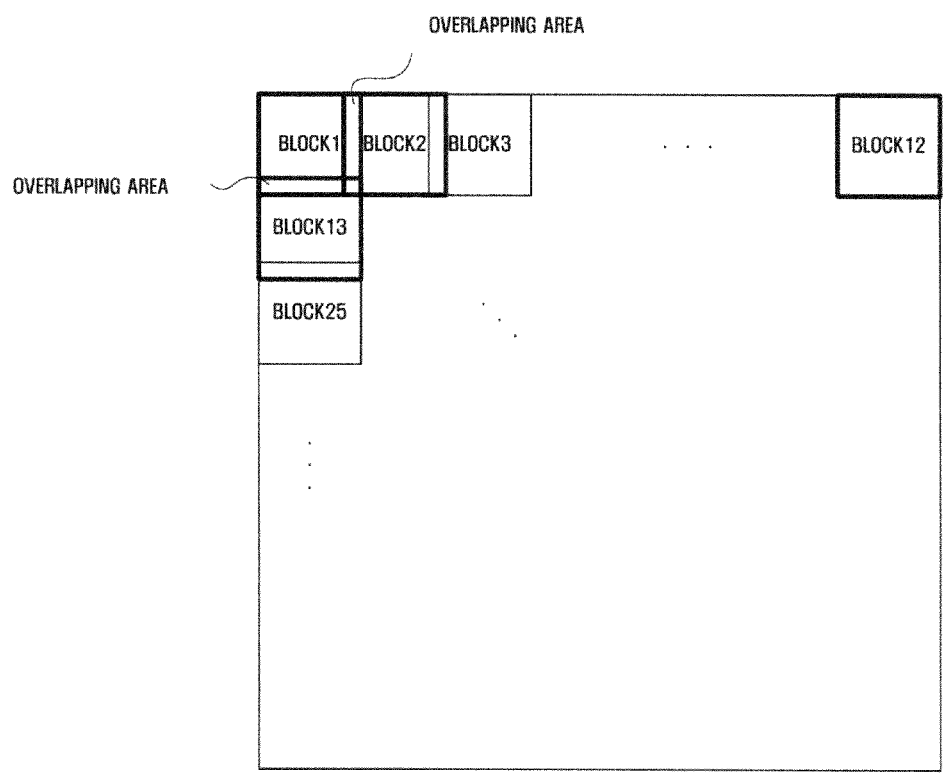
FIG. 3 is a diagram illustrating a process of generating local blocks with an overlapping area according to an embodiment of the present invention.

FIG. 3 is a diagram illustrating a process of generating local blocks with overlap areas according to an embodiment of the present invention. As shown in FIG. 3, the local blocks have the same size to divide an input image and are formed to have an overlapping area between neighboring local blocks. The local blocks are subjected to image processing, respectively, and the respective local blocks pass through the final-image generator 170 are finally summed to each other. Here, if there is no overlapping area between the respective local blocks, an unnatural image may be generated at boundaries between each of neighboring local blocks. The image at the boundaries between each of neighboring local blocks can be made smooth by separate image-processing on the overlapping area (described later).

The distance-estimation unit 120 estimates distances of each local block image. Here, the distance refers to a distance ranging from the image-capture device 200 to an object.

There are various known technologies for estimating the distance ranging from the image-capture device 200 to the object. A distance-estimation process according to an embodiment of the present invention will now be described with reference to FIGS. 4 through 6.

First, an input image is separated by components (e.g., RGB, or YCbCr). The present invention will now be described by way of example of an input image with red, green, and blue channels.

Next, edge strengths (ES) of the separated red, green, and blue channels are detected and edge maps for the red, green, and blue channels are generated.

This step is to calculate an extent of blurring, i.e., a blur level for each channel. A blur level of an image is closely related with sharpness of the image.

In general, since a difference in the refractive index depending on the wavelength of light when photographing causes a different image to be formed, there is a difference in the sharpness between each of the red, green, and blue channels. Thus, when positions of a lens 205 and an image sensor 215 are determined, images formed on the image sensor 215 vary according to the position of an object. This phenomenon is caused by longitudinal chromatic aberration. Chromatic aberrations are wavelength-dependent artifacts that occur because the refractive index of option glass varies with wavelength, thereby making the position and size of an image vary according to the wavelength. The longitudinal chromatic aberration is an axial shift in the focus position with wavelength.

Figure 4:
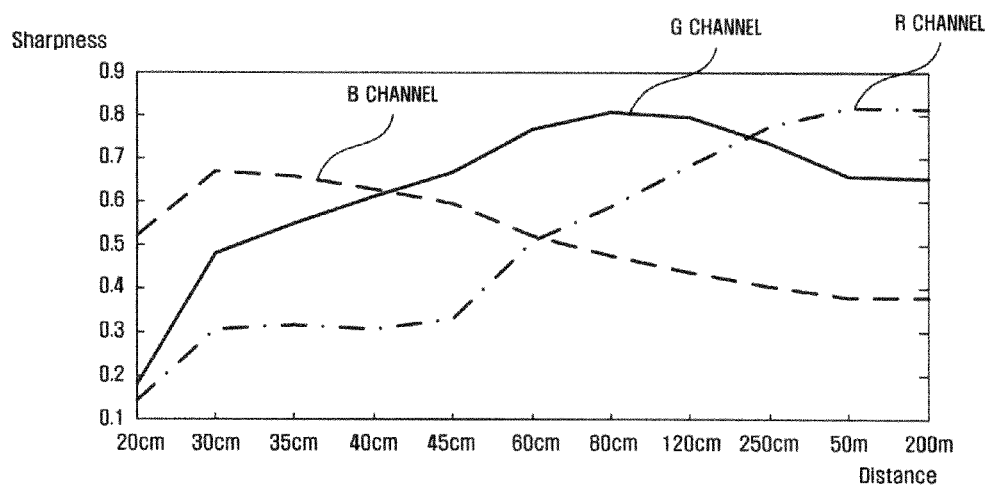
FIG. 4 is a graphical representation for comparing sharpness for each of red (R), green (G), and blue (B) channels depending on the distance from an object to an image sensor.

FIG. 4 is a graphical representation for comparing sharpness for each of red (R), green (G), and blue (B) channels depending on the distance from an object to an image sensor.

Referring to FIG. 4, with regard to sharpness depending on the distance from the object to the image sensor 215 (or a distance from the object to a lens), a high level of blurring occurs in the R and G channels in the case of an object far from the image sensor 215, and a high level of blurring occurs in the B and G channels. That is, the sharpness of the close object is highest in the B channel, while the sharpness of the farthest object is highest in the R channel.

Figure 5:
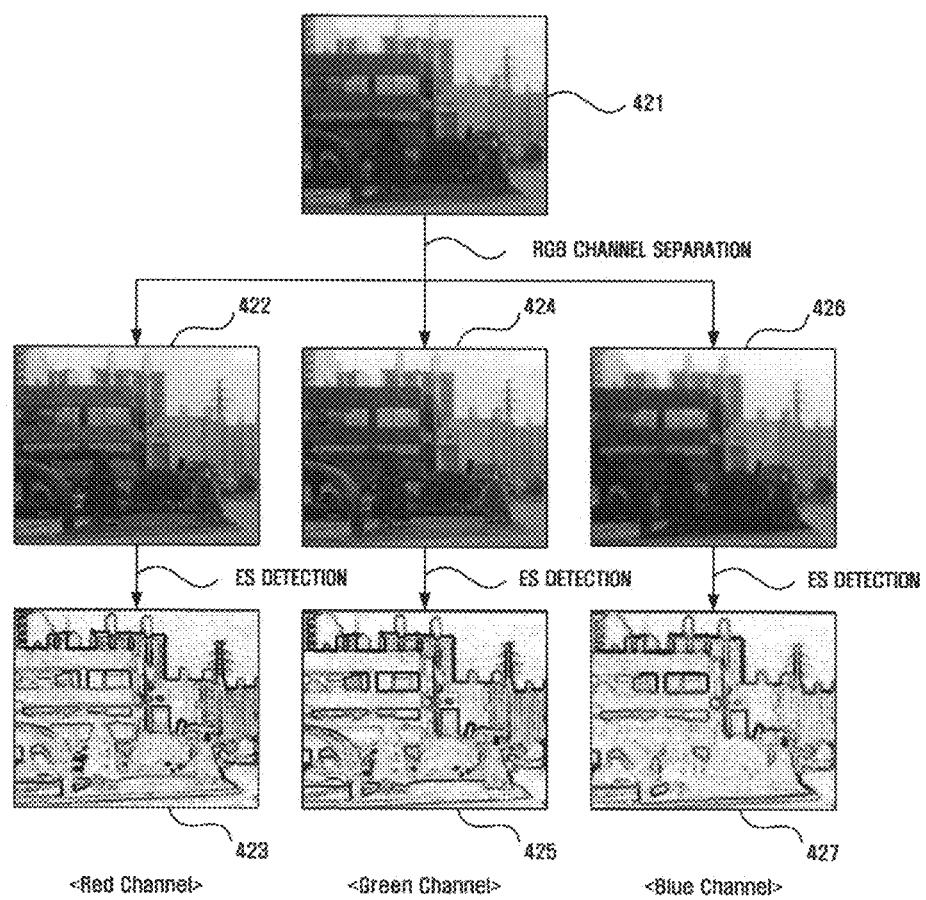
FIG. 5 is a diagram illustrating a process of generating edge maps by detecting edge strength of each of red, green, and blue channels from an input image.

FIG. 5 is a diagram illustrating a process of generating edge maps by detecting edge strength of each of red, green, and blue channels from an input image.

In order to detect the edge strength (ES) of each of images 422, 424, and 426 for the red, green, and blue channels from the input image 421, a high pass filter (HPF) can be used. The HPF is a filter that passes a signal having a frequency higher than a cutoff frequency without attenuation, while passing a signal having a frequency lower than the cutoff frequency after attenuation. An example of the HPF is a Laplacian filter.

In addition, the edge strength (ES) of each image for the red, green, and blue channels can also be detected from the input image 421 using a 2-dimensional filter (2-D filter). An example of the 2-D filter is a Sobel filter.

After detecting the edge strength (ES) of each of the red, green, and blue channels in the above-described manner, edge maps 423, 425, and 427 representing the edge strength (ES) of each channel can be formed. Meanwhile, the edge strength (ES) of the red, green, and blue channels can be determined by the distance from the object to the image sensor 215.

Next, edge strengths of the red and blue channels are compensated. The edge strengths of the red and blue channels are compensated to reduce noise effects in various calculations using the edge strengths of the red and blue channels. That is, edge-strength compensation is performed for the purpose of forming noise-free edge maps of the red and blue channels.

Since the green channel is generally noise-insensitive, the noise of the green channel is less than that of the red or blue channel. Thus, in order to reduce an adverse effect in the red or blue channel, that is, the noise that the image sensor 215 regards as edges, the green channel is used. A weight value produced by the edge strength of the green channel can be used in compensating the edge strength of the red or blue channel.

Figure 6:
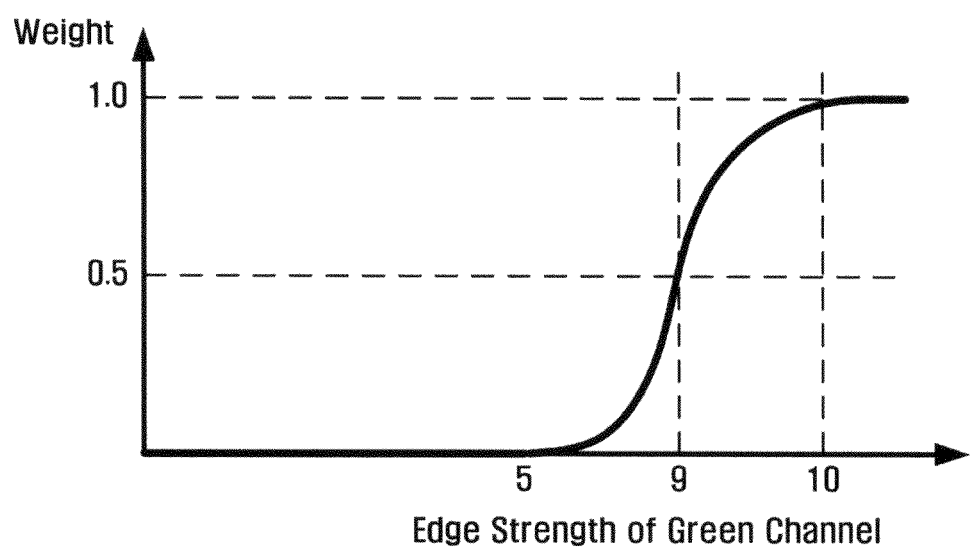
FIG. 6 is a graph illustrating a weight value produced by edge strength at an arbitrary point (x, y) on an edge map of a green channel.

FIG. 6 is a graph illustrating a weight value produced by edge strength at an arbitrary point (x, y) on an edge map of a green channel.

As shown in FIG. 6, the weight value, which is a relative value representing the edge strength at an arbitrary point (x, y) on the edge map of the green channel, is normalized to have a value between 0 and 1 over the entire range of the edge strength on the edge map of the green channel.

A method of compensating the edge strength at an arbitrary point (x, y) on the edge map of the red or blue channel using formula (1) given below will now be described.

$$\text{Red } ES \text{ Compensation}(x,y) = W \times ES \text{ of Red}(x,y)$$

$$\text{Blue } ES \text{ Compensation}(x,y) = W \times ES \text{ of Blue}(x,y), \quad (1)$$

where W is a weight value depending on the edge strength at an arbitrary point (x, y) on the edge map of the green channel, ES of Red(x, y) and ES of Blue(x, y) are edge strengths at an arbitrary point (x, y) on each edge map of the red or blue channel, Red ES Compensation(x, y) and Blue ES Compensation(x, y) are corrected edge strengths at an arbitrary point (x, y) on the edge map of the red or blue channel, respectively. That is, by multiplying the edge strength at the arbitrary point (x, y) on the edge map of the red or blue channel by the weight value depending on the edge strength at the arbitrary point (x, y) on the edge map of the green channel.

For example, an edge that exists on the edge map of the green channel but does not exist on the edge map of the red or blue channel has a weight value of 0, and is processed as a non-existent edge by ES compensation. That is, the edge that exists on the edge map of the green channel but does not exist on the edge map of the red or blue channel is recognized as noise and removed, thereby reducing the adverse effect of recognizing noise as edges.

Next, the effective value representing a blur level is obtained using the compensated edge strength of the red or blue channel.

The effective value representing a blur level means a value corresponding to the distance from an object to the image sensor 215.

The effective value representing the blur level is obtained using the formula (2):

$$\text{Effective Value} = \Sigma \text{RedESCompensation}/\Sigma \text{BlueESCompensation} \quad (2)$$

As expressed in Formula (2), the effective value is a ratio of the summation of compensated edge strength of the red channel to the summation of compensated edge strength of the blue channel. As described above, the edge strength of the red or blue channel is determined by the distance from the object to the image sensor 215, the effective value becomes the absolute value corresponding to the distance.

Referring to FIG. 4, in a case of an object close to the image sensor 215, the edge strength of the red channel is relatively small and the edge strength of the blue channel is relatively large, the effective value is less than 1. Conversely, in a case of an object far from the image sensor 215, the effective value is greater than 1.

Effective values of an image captured from different distances can be used for distance estimation. Preferably, a graph or table can also be used for distance estimation, the graph or table showing the relationship between effective values obtained from the image off-line captured from different distances iteratively and the distance from the object to the image sensor 215. That is, the distance from the object matching the effective values to the image sensor 215 is experimentally obtained and the effective values of the image are calculated, thereby achieving distance estimation.

Figure 7:
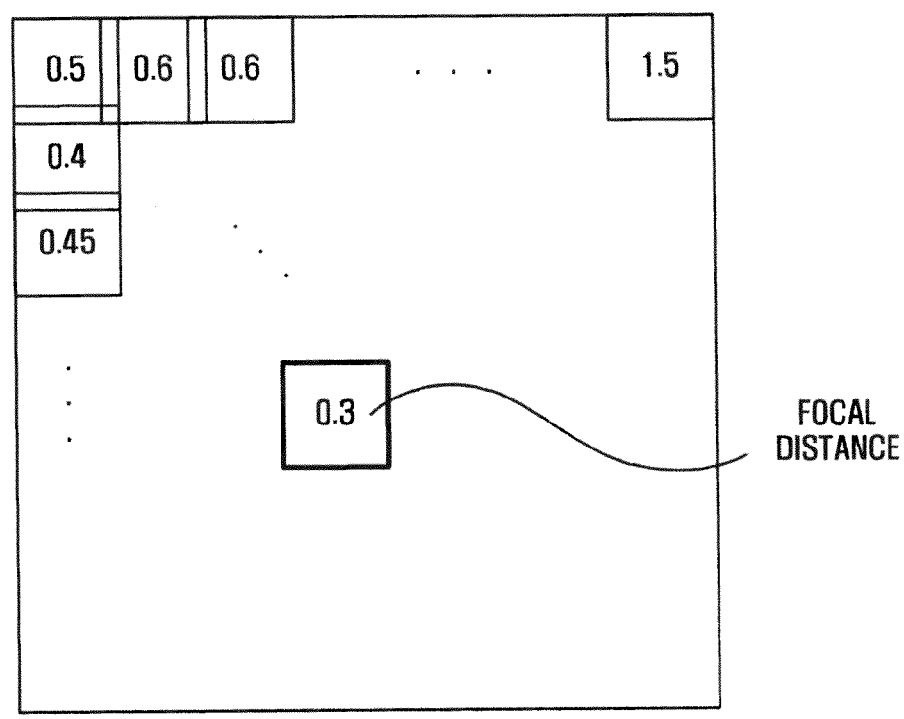
FIG. 7 is a diagram illustrating a process of setting a focal distance among estimated distances of local block images according to an embodiment of the present invention.

Referring to FIG. 2, among the estimated distances of the local block image estimated by the distance-estimation unit 120, the focal-distance-setting unit 130 sets a focal distance for auto-focusing of the input image. In general, the closest distance is set as a focal distance for auto-focusing in obtaining an auto-focused image. Therefore, as shown in FIG. 7, the closest distance, i.e., 0.3, among the estimated distances for the respective local blocks, can be set as the focal distance. Referring to FIG. 7, the farthest distance for the local blocks is 1.5. Meanwhile, the distance for a local block corresponding to a particular object may be set as a focal distance. For example, an estimated distance for the local block corresponding to a human face image may be set as a focal distance.

The reblurred-image generator 140 generates a reblurred image from each local block image.

Figure 8:
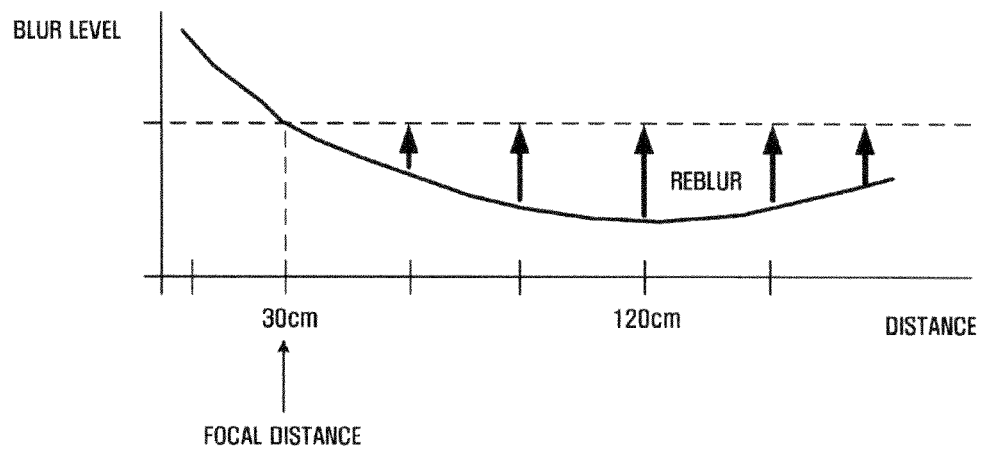
FIG. 8 is a graph illustrating blur levels depending on the distance between an object and a lens when an image is obtained by the lens having a focal distance of 120 cm.

FIG. 8 is a graph illustrating blur levels depending on the distance between an object and a lens when an image is obtained by the lens having a focal distance of 120 cm.

Referring to FIG. 8 illustrating the relationship between the distance from the object and the blur level when an object image is captured from various distances by a lens having a focal distance of 120 cm, an image focused at a distance of 120 cm has the smallest blur level. That is, the sharpness of the object positioned at 120 cm is highest. At 120 cm, the blur level increases toward the left and right directions, making the image blurry. While FIG. 8 illustrates a lens having a focal distance of 120 cm by way of example, a lens having a different focal distance may have a curve similar to that shown in FIG. 8.

When a blur level of the local block image is greater than a blur level of a local block image for setting the focal distance, the reblurred-image generator 140 maintains the local block image at its blur level. In contrast, when the blur level of the local block image is less than the blur level of the focal-distance-setting local block image, the reblurred-image generator 140 reblurs the local block image to equal to or greater than the blur level of the focal-distance-setting local block image.

Referring to FIG. 7, a focal distance is set to 0.3. That is, the blur level of the local block image having a focal distance of the input image corresponds to a blur level at an intersecting point of dotted lines shown in FIG. 8. Referring to FIG. 8, since the blur level of the local block image is greater than a blur level of a local block image for setting the focal distance at the left area of a focal distance 30 cm where distances of the respective local blocks are less than 30 cm, the blur level of the local block image is maintained without reblurring. In contrast, since the blur level of the local block image is less than the blur level of a local block image for setting the focal distance at the right area of the focal distance 30 cm where distances of the respective local blocks are greater than 30 cm, the local block image is reblurred to the blur level or greater. For example, the local block image is reblurred to the blur level 30 cm, as indicated by arrows in FIG. 8.

Figure 9:
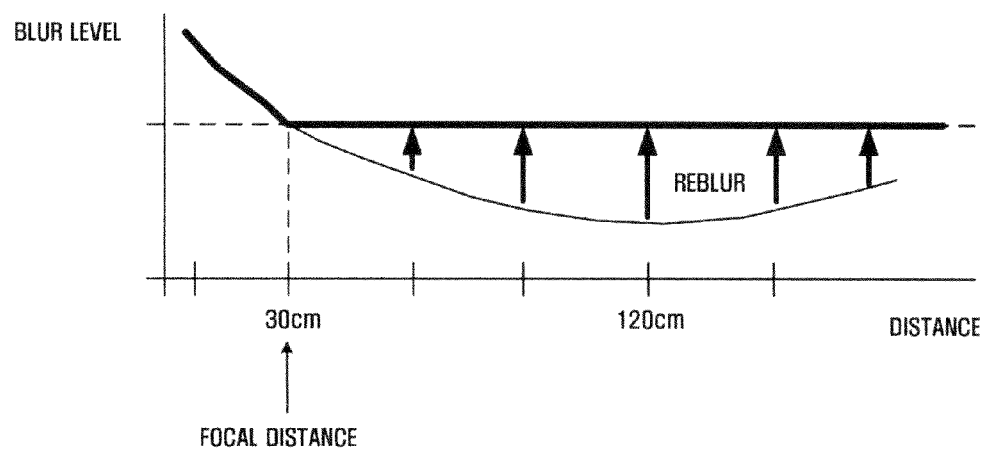
FIG. 9 is a diagram illustrating a process of reblurring an image by varying blur levels according to the position of an object based on a focal distance set for auto-focusing.

FIG. 9 is a diagram illustrating a process of reblurring an image by varying blur levels according to the position of an object based on a focal distance set for auto-focusing. As described above, at the left area of the set focal distance, i.e., 30 cm, since the blur level of the local block image is greater than a blur level corresponding to a position of 30 cm, the local block image is maintained without reblurring. In contrast, at the right area of the set focal distance, since the blur level of the local block image is less than the blur level corresponding to the position of 30 cm, the local block image is reblurred to the blur level corresponding to the position of 30 cm.

Reblurring of an input image using a Gaussian function is a well-known technology. In an embodiment of the present invention, a local block image can be reblurred using a standard deviation value of the Gaussian function according to the distance and the focal distance of the local block image. The standard deviation value is obtained prior to performing reblurring.

The following table shows standard deviation (Sigma) values of the Gaussian function for performing reblurring according to the set focal distance and the distance from an object. The table is obtained by a learning-based approach with a lens having a focal distance set to 120 cm. As shown in the following table, when the distance from the object is 120 cm, the standard deviation (Sigma) value for reblurring is largest irrespective of the set focal distance. As shown in FIG. 8, the sharpness of the object positioned at distance 120 cm is the highest. That is, in order to reblur the image to a blur level corresponding to the set focal distance, the reblurring is to be performed at maximum strength. The standard deviation (Sigma) values obtained by learning in advance are stored in a tabulated form, and reblurring is then performed using the standard deviation (Sigma) value.

TABLE

| Focal | Distance from object | | | | |
|---|---|---|---|---|---|
| distance | 45 cm | 80 cm | 120 cm | 200 cm | 50 m |
| 30 cm | Sigma = 1 | Sigma = 2 | Sigma = 3 | Sigma = 2 | Sigma = 2 |
| 60 cm | Sigma = 0.6 | Sigma = 1 | Sigma = 1.2 | Sigma = 1 | Sigma = 0.6 |
| . | . | . | . | . | . |
| . | . | . | . | . | . |

Referring to FIG. 2, the reconstructed image generator 150 generates an in-focus image focused to the estimated distances for each local block image. That is, images of the local blocks are all out-of-focus images, except for the image of the local block corresponding to the distance of 120 cm, as shown in FIG. 8. The out-of-focus images of each local block are subjected to image processing to generate in-focus images.

Figure 10:
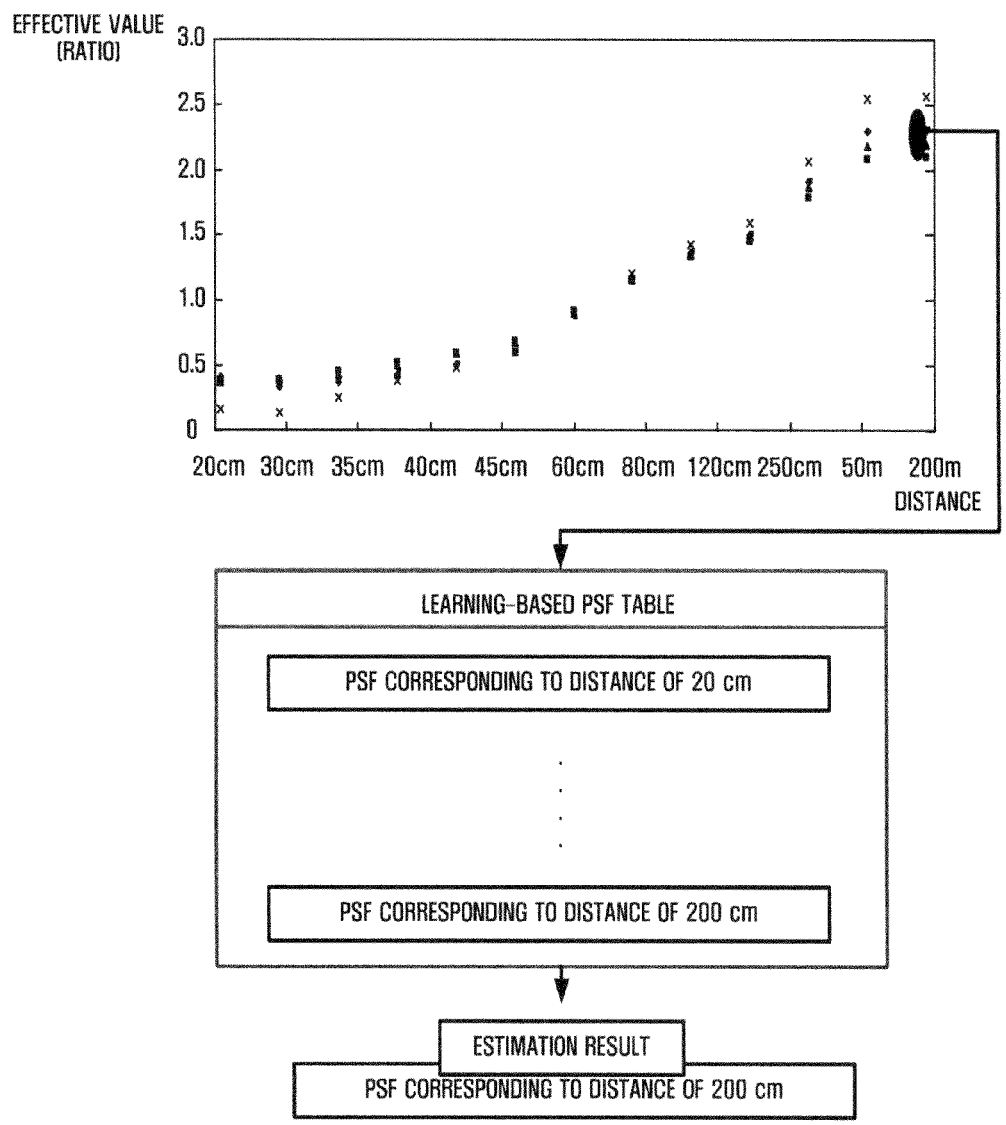
FIG. 10 is a diagram illustrating a process of estimating a point spread function according to the distance from an object using a point spread function table prepared by a learning-based approach.

FIG. 10 is a diagram illustrating a process of estimating a point spread function according to the distance from an object using a point spread function table prepared by a learning-based approach.

Referring to FIG. 10, as described above, the effective value obtained using the formula (2) is related with the distance from the object. If the distance from the object is known, a point spread function (PSF) corresponding to the distance can be obtained. The distance-dependent PSF can be prepared by a learning-based approach according to the specification of a lens. Thus, a distance of a local block is estimated by a distance-estimation unit and the PSF corresponding to the estimated distance is then estimated. In FIG. 10, assuming that the distance of the local block is 200 m, the PSF corresponding to the distance 200 can be estimated using the PSF prepared according to the specification of a lens. A deconvolution filter is applied to the PSF, thereby reconstructing an in-focus image. Examples of the well-known deconvolution filter applied to a given PSF for removing blurs include a Wiener filter, a Lucy-Richardson filter, and so on.

The local-block-image-matching unit 160 matches the reblurred local block image, generated by the reblurred-image generator 140, to the in-focus local block image, generated by the reconstructed image generator 150, with different weight values based on the set focal distance. That is, for each local block, a reblurred image and an in-focus image are generated. If a difference between the set focal distance and the local block distance is small, a higher weight value is assigned to the in-focus image to generate a relatively sharp local block image. In contrast, if a difference between the set focal distance and the local block distance is large, a higher weight value is assigned to the reblurred image to generate a relatively blurry local block image.

The weight value (W) assigned to the reblurred image can be obtained by Formula (3):

$$W = \frac{(|\text{Local block distance} - \text{Focal distance})}{|\text{Farthest distance} - \text{Focal distance}|} \quad (3)$$

In FIG. 7, since the focal distance is set to 0.3 and the farthest distance of a local block, i.e., a right topmost local block is 1.5, the weight value of a left topmost local block having a distance of 0.5, can be obtained by the Formula (3), that is, $$W = \frac{|0.5 - 0.3|}{|1.5 - 0.3|}.$$

Therefore, the local block image and the reblurred image are obtained by applying the obtained weight value to the Formula (4) given below:

Matched local block image=(1−W)*(In-focus local block image)+W*(Reblurred local block image)  (4)

Figure 11:
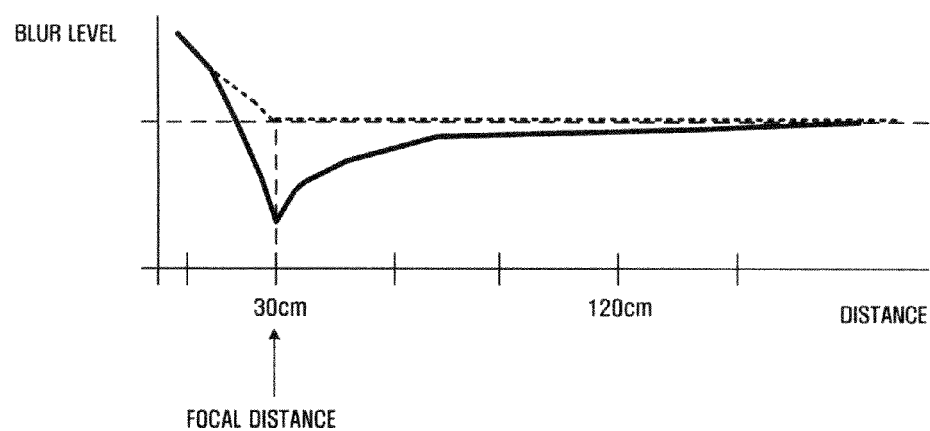
FIG. 11 is a graph illustrating the distance-dependent blur level of a finally auto-focused image when a focal distance for auto-focusing is set to 30 cm according to an embodiment of the present invention.

FIG. 11 is a graph illustrating the distance-dependent blur level of a finally auto-focused image when a focal distance for auto-focusing is set to 30 cm according to an embodiment of the present invention. In FIG. 11, since the focal distance is set to 30 cm, an image having the highest degree of sharpness, that is, an image having the lowest blur level, is generated at 30 cm. The distance becomes far from the focal distance of 30 cm, the blur level of an image gradually increases, thereby generating a relatively blurry image. Therefore, an auto-focused image, which is focused to an object positioned at the distance of 30 cm, can be generated.

The final-image generator 170 generates a final image by summing the local block images matched by the local-block-image-matching unit 160. As described above with reference to FIG. 3, when there is an overlapping area between each of the local blocks, separate matching methods are required.

One way of processing the overlapping area is to match local block images producing the overlapping area to each other using a median value obtained by simply averaging overlapping areas of the local block images.

An alternative to processing the overlapping area is to match local block images producing the overlapping area with different weight values according to overlapping positions.

Figure 12:
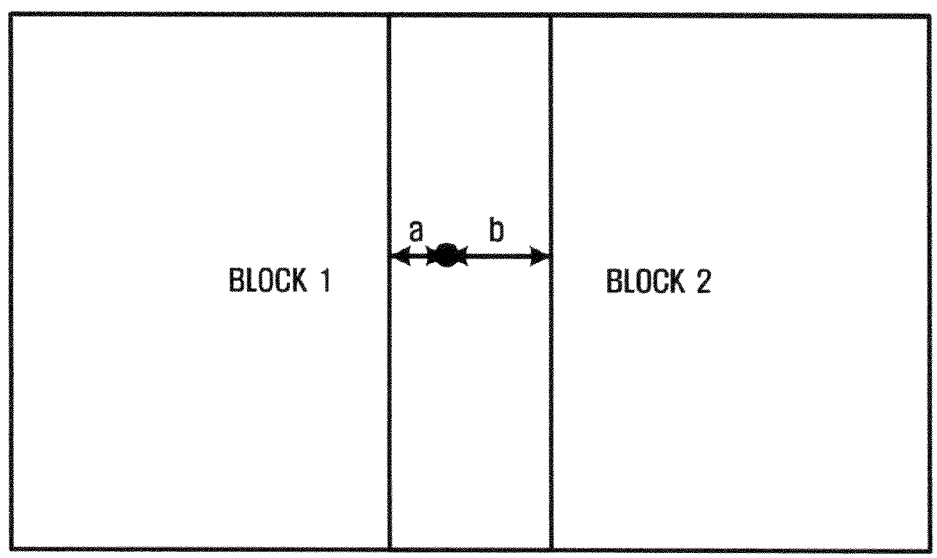
FIG. 12 is a diagram illustrating a method of matching an overlapping area of local blocks.

FIG. 12 is a diagram illustrating a method of matching overlap regions of local blocks. In an overlapping area between a block 1 and a block 2, since a position indicated by a thick point is closer to the block 1 relative to the overlapping area, the position indicated by the thick point is likely to be more similar to an image of the block 1 than to an image of the block 2. Accordingly, a higher weight value is assigned to the block 1 of the overlapping area to match the image of the block 1 to the image of the block 2. Referring to FIG. 12, in order to match the images of the overlapping area, a weight value of b/(a+b) is assigned to the image of the overlapping area of block 1 and a weight value of a/(a+b) is assigned to the image of the overlapping area of block 2.

FIG. 13 is a flowchart illustrating a method for digital auto-focusing according to an embodiment of the present invention.

First, a local block is generated from an input image (S310). Preferably, the local block is formed such that an overlapping area is produced between neighboring local blocks.

Next, distances of each local block image are estimated (S320). Distance estimation methods are as described above, and other known technologies can also be used.

Then, a reblurred image is generated from each local block image (S330a). An in-focus image that is focused to the estimated distances is generated from the each local block image (S330b). the blur level of the local block image is less than that of a local block image for setting a focal distance, the pertinent local block image is reblurred to equal to or higher than the blur level of the local block image for setting the focal distance. When a blur level of the local block image is greater than a blur level of a local block image for setting the focal distance, the local block image is maintained at its blur level. In contrast, when the blur level of the local block image is less than the blur level of the focal-distance-setting local block image, the local block image is reblurred to have a blur level equal to or greater than the blur level of the focal-distance-setting local block image.

Here, the focal distance is a distance set for auto-focusing among the estimated distances of each local block image. Preferably, among the estimated distances of each local block image, the closest distance may be set as the focal distance. A local block image can be reblurred using a standard deviation value of the Gaussian function according to the distance and the focal distance of the local block image. The standard deviation value is obtained prior to performing reblurring. Then, a point spread function (PSF) is estimated according to the estimated distances of the local block image, and a deconvolution filter is applied to the estimated PSF, thereby generating the in-focus image focused to the estimated distances.

Examples of the deconvolution filter include the Wiener filter and the Lucy-Richardson filter.

The reblurred image is matched to the in-focus image using different weight values based on the set focal distance (S340). Here, as the local block image distance becomes close to the focal distance, a higher weight value is assigned to the in-focus local block image to match the reblurred local block image to the in-focus image.

Last, a final image is generated by summing the matched local block images (S350). Here, in a case where the local blocks having an overlapping area produced therebetween are formed, the overlapping area may be separately matched.

One way of matching the overlapping area is to simply match local block images producing the overlapping area.

An alternative way of matching the overlapping area is to match local block images producing the overlapping area with different weight values according to overlapping positions.

It will be understood by those of ordinary skill in the art that various changes in form and details may be made therein without departing from the spirit and scope of the present invention as defined by the following claims. Therefore, it is to be appreciated that the above described exemplary embodiments are for purposes of illustration only and are not to be construed as a limitation of the invention. The scope of the invention is given by the appended claims, rather than the preceding description, and all variations and equivalents which fall within the range of the claims are intended to be embraced therein.

What is claimed is:

1. An apparatus for digital auto-focusing, comprising:
a local block generator generating a plurality of local block images from an input image;

a distance-estimation unit estimating distances of each local block image;

a focal-distance-setting unit setting one of the estimated distances of the local block images as a focal distance of the input image;

a reblurred-image generator generating a corresponding reblurred local block image for each local block image;

a reconstructed image generator generating a corresponding in-focus local block image focused to the estimated distances of each local block image;

a local-block-image-matching unit matching each reblurred local block image to each in-focus local block image with different weight values based on the set focal distance; and a final-image generator generating a final image by summing the matched local block images using the corresponding weight values, wherein the local block images are generated by dividing the input image into pixels of a predetermined interval.

2. The apparatus of claim 1, wherein the local block generator generates the local block images such that an overlapping area is produced between neighboring local images.

3. The apparatus of claim 2, wherein the final-image generator generates a final image for the overlapping area by matching the overlapping area of the local block images producing the overlapping area.

4. The apparatus of claim 2, wherein the final-image generator generates a final image for the overlapping area by matching the local block images producing the overlapping area to each other with different weight values according to the overlapping position.

5. The apparatus of claim 1, wherein the focal-distance-setting unit sets the closest distance among the estimated distances of the local block image as the focal distance of the input image.

6. The apparatus of claim 1, wherein when a blur level of the local block image is greater than a blur level of a local block image for setting the focal distance, the reblurred-image generator maintains the local block image at its blur level while reblurring the local block image to be equal to or greater than the blur level of the focal-distance-setting local block image when the blur level of the local block image is less than the blur level of the focal- distance-setting local block image.

7. The apparatus of claim 1, wherein the reblurred-image generator reblurs the local block image using a standard deviation value of the Gaussian function according to the distance of the local block image and the focal distance.

8. The apparatus of claim 1, wherein the reconstructed image generator generates the in-focus image focused to the estimated distances by estimating a point spread function according to the estimated distances and applying a deconvolution filter to the estimated point spread function.

9. The apparatus of claim 8, wherein the deconvolution filter is a Wiener filter or a Lucy Richardson Approach filter.

10. The apparatus of claim 1, wherein as the estimated distance of the local block image becomes close to the focal distance, a higher weight value is assigned to the in-focus local block image to match the reblurred local block image to the in-focus image.

11. A method for digital auto-focus comprising:
generating a plurality of local block images from an input image;
estimating distances of each local block image;
generating a corresponding reblurred local block image from the local block image and generating a corresponding in-focus local block image focused to the estimated distances for each local block image;
matching each reblurred local block image to each in-focus local block image with different weight values based on the set focal distance; and
a final-image generator generating a final image by summing the matched local block images using the corresponding weight values,
wherein the local block images are generated by dividing the input image into pixels of a predetermined interval.

12. The method of claim 11, wherein the generating of the local block image comprises generating the local block images such that an overlapping area is produced between neighboring local block images.

13. The method of claim 12, wherein the generating of the final image comprises generating the final image for the overlapping area by matching the overlapping area of the local block images producing the overlapping area.

14. The method of claim 12, wherein the generating of the final image comprises generating the final image for the overlapping area by matching the local block images producing the overlapping area to each other with different weight values according to the overlapping position.

15. The method of claim 11, wherein the set focal distance is the closest distance among the estimated distances of the local block images.

16. The method of claim 11, wherein when a blur level of the local block image is greater than a blur level of a local block image for setting the focal distance, the generating of the reblurred image comprises maintaining the local block image at its blur level, while reblurring the local block image to equal to or greater than the blur level of the focal-distance-setting local block image when the blur level of the local block image is less than the blur level of the focal-distance-setting local block image.

17. The method of claim 11, wherein the generating of the reblurred image comprises reblurring the local block image using a standard deviation value of the Gaussian function according to the distance of the local block image and the focal distance.

18. The method of claim 11, wherein the generating of the reconstructed image comprises generating an in-focus image focused to the estimated distances by estimating a point spread function according to the estimated distances and applying a deconvolution filter to the estimated point spread function.

19. The method of claim 18, wherein the deconvolution filter is a Wiener filter or a Lucy Richardson Approach filter.

20. The method of claim 11, wherein as the estimated distance of the local block image becomes close to the focal distance, a higher weight value is assigned to the in-focus local block image to match the reblurred local block image to the in-focus image.

21. The method of claim 11, wherein the weight values represent an edge strength at a point on an edge map of the input image.

* * * * *